United States Patent
Waldman et al.

(10) Patent No.: US 11,621,927 B2
(45) Date of Patent: Apr. 4, 2023

(54) AUTHENTICATION AND DATA LANE CONTROL

(71) Applicant: MELLANOX TECHNOLOGIES, LTD., Yokneam (IL)

(72) Inventors: Eyal Moshe Waldman, Tel Aviv (IL); Yaakov Gridish, Yokneam Illit (IL); Elad Mentovich, Tel Aviv (IL); Boaz Atias, Maale Adumim (IL); Andrey Ger, Shlomi (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 4 days.

(21) Appl. No.: 17/101,252

(22) Filed: Nov. 23, 2020

(65) Prior Publication Data

US 2022/0166727 A1 May 26, 2022

(51) Int. Cl.
*H04L 49/00* (2022.01)
*H04L 43/0823* (2022.01)
*H04L 49/1515* (2022.01)
*H04L 9/40* (2022.01)

(52) U.S. Cl.
CPC .......... *H04L 49/30* (2013.01); *H04L 43/0823* (2013.01); *H04L 49/1523* (2013.01); *H04L 63/18* (2013.01)

(58) Field of Classification Search
CPC . H04L 49/30; H04L 43/0823; H04L 49/1523; H04L 63/18
See application file for complete search history.

(56) References Cited

U.S. PATENT DOCUMENTS

| 5,852,653 | A | * | 12/1998 | Reel | H04M 1/663 |
| | | | | | 379/93.04 |
| 7,596,635 | B2 | * | 9/2009 | Siorek | G05B 19/054 |
| | | | | | 710/17 |
| 7,934,959 | B2 | | 5/2011 | Rephaeli et al. | |
| 2008/0181123 | A1 | * | 7/2008 | Huang | H04L 43/50 |
| | | | | | 370/465 |
| 2016/0380709 | A1 | * | 12/2016 | Alshinnawi | H04B 3/46 |
| | | | | | 370/216 |
| 2017/0075699 | A1 | * | 3/2017 | Narayanan | H04L 9/006 |
| 2019/0109714 | A1 | * | 4/2019 | Clark | G06F 21/53 |
| 2020/0220873 | A1 | * | 7/2020 | Adiga | H04L 63/10 |
| 2021/0044563 | A1 | * | 2/2021 | Reyes | G06F 21/564 |
| 2021/0084037 | A1 | * | 3/2021 | Nakanuma | H04L 63/14 |
| 2021/0232708 | A1 | * | 7/2021 | Sheng | G06F 21/72 |
| 2022/0014533 | A1 | * | 1/2022 | Almaz | H04L 43/16 |

FOREIGN PATENT DOCUMENTS

GB 2587253 A * 3/2021 ............. H01R 24/64

* cited by examiner

*Primary Examiner* — Charles C Jiang
*Assistant Examiner* — Biswajit Ghose
(74) *Attorney, Agent, or Firm* — Sheridan Ross P.C.

(57) ABSTRACT

An authentication method, network switch, and network device are provided. In one example, a method is described that includes receiving a first signal indicative of a data lane being activated and configured to carry data to or within the network switch, receiving a second signal indicative of an authentication lane being established in the network switch or a device connected to the network switch, where the authentication lane is different from the data lane, and enabling data transmission across the data lane only in response to receiving the second signal indicative of the authentication lane being established.

25 Claims, 12 Drawing Sheets

AUTHENTICATION AND DATA LANE CONTROL

FIELD OF THE DISCLOSURE

The present disclosure is generally directed toward networking and, in particular, toward networking devices, switches, and adapters.

BACKGROUND

Switches and similar network devices represent a core component of many communication, security, and computing networks. Switches are often used to connect multiple devices, device types, networks, and network types. As networks and network devices adapt and evolve, the mechanical and electrical interfaces used to connect these devices also change.

Pluggable modules (e.g., Small Form-factor Pluggable (SFP) modules, Quad Small Form-factor Pluggable (QSPF) modules, QSFP+, etc.) have been developed to interface between a printed circuit board in a network device (e.g., a switch, Network Interface Card (NIC), router, etc.) and a network cable. The network cable may be configured to carry signals from one device to another using electrical signals or optical signals. The pluggable modules provide the appropriate mechanical and electrical components to enable the network device to interface with the network cable. Pluggable modules are useful in that they can enable a single switch to interface with multiple different network types, where the network cables used for the different network types comply with different communication protocols, have different mechanical interfaces, have different electrical interfaces, and so on.

BRIEF SUMMARY

With the ongoing development of pluggable modules and advancement of new network technologies, a security risk has emerged. Specifically, the pluggable modules represent a point in the network where a "man-in-the-middle" attack could be launched. Because the pluggable modules have so much data passing through them and because the pluggable modules are generally simple electromechanical devices, it is possible for an attacker to replace or modify a pluggable module to copy data passing therethrough and then replay or share the copied data outside the network without detection or permission. Pluggable modules have not been developed with the ability to prove their authenticity or lack of tamper to the switch in which they are used. The only check of authenticity performed by the switch is to determine if the pluggable module is behaving in an expected manner by allowing the appropriate data to pass between the network cable and internal circuitry of the switch. Thus, the switch and components thereof currently blindly trust that the pluggable module is authentic and is not performing any nefarious operations on the data passing therethrough.

Embodiments of the present disclosure aim to solve the above-noted shortcomings and other issues associated with pluggable modules and the network devices in which they are used. Specifically, embodiments of the present disclosure provide the ability to authenticate a pluggable module, a switch, a NIC, or the like prior to enabling sensitive data to pass therethrough.

In an illustrative example, an authentication method for use in a network switch is disclosed that includes: receiving a first signal indicative of a data lane being activated and configured to carry data from a first port to a second port; receiving a second signal indicative of an authentication lane being established in the network switch, where the authentication lane is different from the data lane; and enabling data transmission across the data lane only in response to receiving the second signal indicative of the authentication lane being established.

In another example, a network switch is disclosed that includes: a first port; a second port; a network adapter device connected between the first port and the second port; a data lane established in the network adapter device and configured to carry data from the first port to the second port; and an authentication lane that is analyzed as part of determining an authenticity of the network adapter device.

In yet another example, a device is disclosed that includes: a first set of terminals configured to mate with a first network interface; a second set of terminals configured to mate with a second network interface; a data lane that is used to carry data from the first set of terminals to the second set of terminals; and an authentication lane that is analyzed as part of determining an authenticity of the device.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
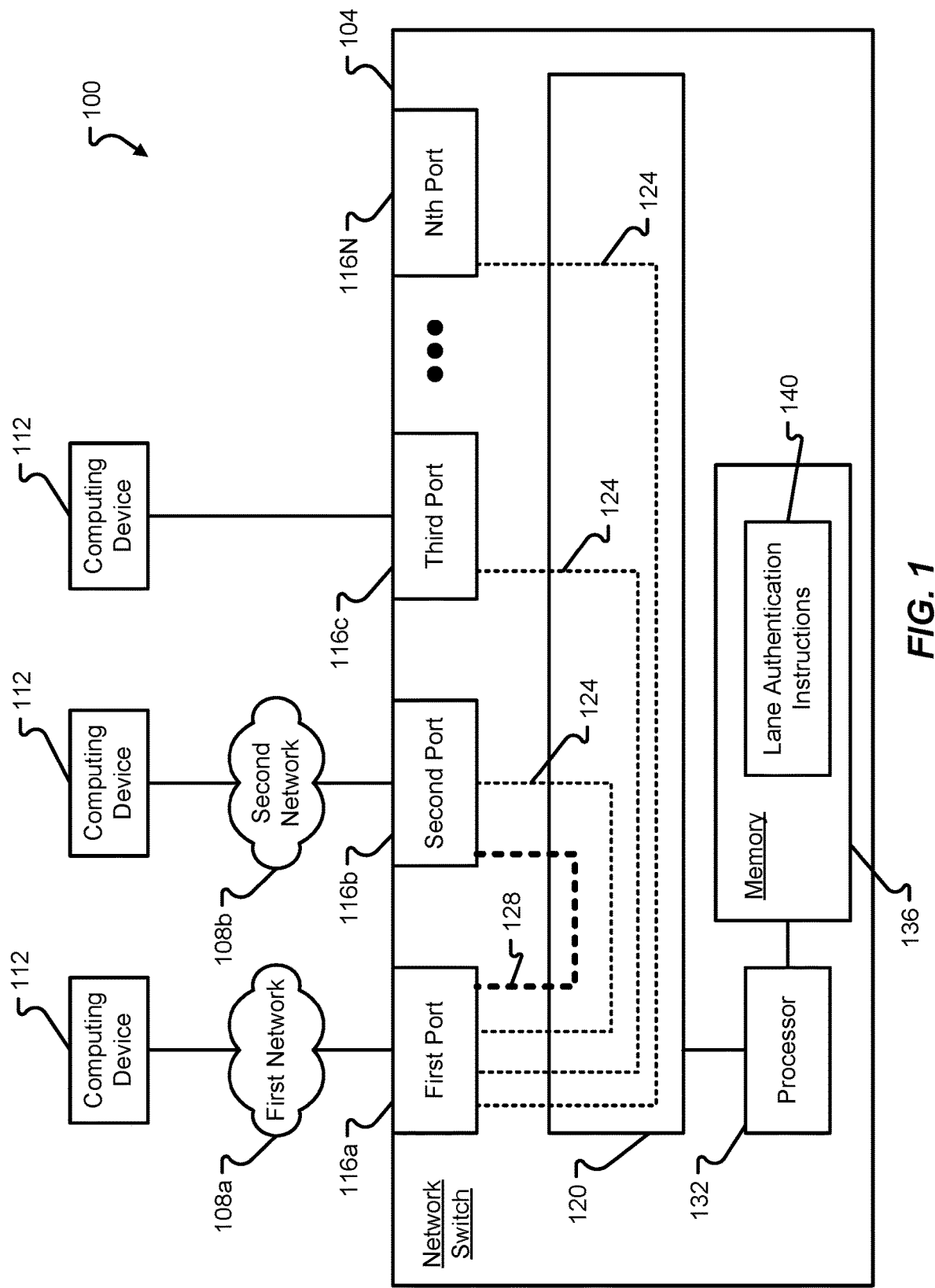
FIG. 1 is a block diagram depicting a first illustrative configuration of a communication system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-12, various systems and methods for authentication and data lane control will be described. While various embodiments will be described in connection with authenticating certain components of or attachable to a network switch, it should be appreciated that embodiments of the present disclosure are not limited to those examples described herein. Rather, embodiments of the present disclosure can be applied to any appropriate type of device or collection of devices for purposes of confirming an authenticity of the device and/or for purposes of controlling data flow through the device. Thus, while particular embodiments will be described in connection with authentication of a switch, a NIC, an adapter device, a pluggable module, or the like, it should be appreciated that the claims are not so limited.

Referring initially to FIGS. 1-6, a first possible configuration of a communication system 100 will be described in accordance with at least some embodiments of the present disclosure. It should be appreciated that the components described with reference to FIGS. 1-6 may or may not also be used in a communication system 100 as shown in FIGS. 7-10.

In the configuration of FIG. 1, a communication system 100 is shown to include a network switch 104 connecting one or more computing devices 112 and/or one or more different networks 108a, 108b. The network switch 104 may include circuitry 120 configured to manage data flows, packet transmissions, etc. between the different computing devices 112. In some embodiments, the circuitry 120 of the network switch 104 may be provided in the form of a NIC, multiple NICs, integrated circuitry, multiple different circuit boards, switches, a Data Processing Unit (DPU), etc. The circuitry 120 may establish a switching architecture or communication bus within the network switch 104. In some embodiments, the circuitry 120 may include relatively simple analog circuit components (e.g., resistors, capacitors, inductors, etc.), digital circuit components (e.g., transistors, logic gates, switches, etc.), Integrated Circuit (IC) chips, memory devices, Field Programmable Gate Arrays (FPGAs), Application Specific Integrated Circuits (ASICs), combinations thereof, and the like.

The computing devices 112 depicted in FIG. 1 may be the same type of computing devices or different types of computing devices. The computing devices 112 do not necessarily need to communicate using the same communication protocol. In some embodiments, some computing devices 112 may connect with a first network 108a, which enables communications using a first communication protocol whereas other computing devices 112 may connect with a second network 108b, which enables communications using a second communication protocol. The network switch 104 may be configured to connect different types of networks 108a, 108b and facilitate machine-to-machine communications between computing devices 112, even if such devices 112 are connected to different networks.

In some embodiments, the first network 108a may correspond to a first network type and the second network 108b may correspond to a second network type. In some embodiments, the first network 108a and second network 108b may correspond to the same network type and utilize the same communication protocols. Non-limiting examples of a network 108a, 108b include an Internet Protocol (IP) network, an Ethernet network, an InfiniBand (TB) network, a Fibre-Channel network, the Internet, a cellular communication network, a wireless communication network, combinations thereof (E.g., Fibre Channel over Ethernet), variants thereof, and the like.

The computing devices 112 may be considered host devices, servers, network appliances, data storage devices, or combinations thereof. A computing device 112, in some embodiments, may correspond to one or more of a Personal Computer (PC), a laptop, a tablet, a smartphone, a server, a collection of servers, or the like. It should be appreciated that a computing device 112 may be referred to as a host, which may include a network host, an Ethernet host, an IB host, etc. As another specific but non-limiting example, one or more of the computing devices 112 may correspond to a server offering information resources, services and/or applications to user devices, client devices, or other hosts in the communication system 100. It should be appreciated that the computing devices 112 may be assigned at least one network address and the format of the network address assigned thereto may depend upon the nature of the network 108a, 108b to which the computing device 112 is connected.

As mentioned above, the network switch 104 may include circuitry 120 that facilitate the interconnectivity of the computing devices 112 and that manages data flows/packet flows between the computing devices 112. The circuitry 120 of the network switch 104 may interface with the networks 108a, 108b via one or more ports 116a-N. Specifically, in the example depicted in FIG. 1, a first port 116a of the network switch 104 is shown to connect the network switch 104 with the first network 108a, a second port 116b of the network switch 104 is shown to connect the network switch 104 to the second network 108b, a third port 116c is shown to be directly connected to a computing device 112 (e.g., without a broader network provided between the network switch 104 and computing device 112), and the Nth port 116N is shown to be open and available to receive a new network connection. Each port 116a-N may include one or more mechanical, electrical, and/or optical components that interface with a network cable designed. The ports 116a-N may, therefore, be designed to facilitate electrical communications, optical communications, or combinations thereof. As will be discussed in further detail herein, the ports 116a-N may include a number of terminals that mate with a network interface provided by a network cable and different ports 116a-N may be configured to communicate using a different number of communication channels, possibly depending upon the nature of the network 108a, 108b with which they are connected. For instance, the first port 116a may be configured to mate with a network interface that communicates using a first number of channels (e.g., 1 channel, 2 channels, 4 channels, 8 channels, 16 channels, . . . , M channels (where M is an integer value greater than or equal to 1), etc.) whereas the second port 116b may be configured to mate with a different network interface that communicates using a second number of channels.

The circuitry 120 may be configured to carry data between ports 116a-N via a number of data lanes 124. One or more data lanes 124 may be established between each pair of ports 116. FIG. 1 illustrates some of the data lanes 124 that may be established between ports 116a-N, but is not intended to depict all of the possible data lanes 124 that may be established. Specifically, FIG. 1 illustrates a single data lane 124 between the first port 116a and each of the other ports 116b, 116c, 116N. It should be appreciated that multiple data lanes 124 may be established between the first port 116a and one of the other ports 116b, 116c, 116N. It should also be appreciated that some ports 116 may not have any data lanes 124 established other ports. For instance, the second port 116b does not necessarily need to have a data lane 124 established with the third port 116c.

The data lanes 124 may be established in circuitry 120 using optical and/or electrical circuit components. Examples of components that may be provided in circuitry 120 to establish the data lanes 124 include, without limitation, resistors, inductors, capacitors, other analog circuit components, diodes, transistors, amplifiers, Integrated Circuits (ICs), microprocessors, other digital circuit components, photodetectors, photodiodes, lasers, light sources, other optoelectrical devices, wires, traces, optical cables, and the like. The circuitry 120 may also include components that enable the movement, switching, disabling, and enabling of data lanes 124 dependent upon control signals received from a processor 132.

In addition to data lanes 124, the circuitry 120 may also be used to establish one or more authentication lanes 128 in the network switch 104. In some embodiments, and as will be described in further detail herein, an authentication lane 128 may be similar to a data lane 124 in that the authentication lane 128 may traverse one or more components of the circuitry 120 and may exhibit certain electrical or signaling characteristics as a result of traversing the particular components of circuitry 120. For instance, an authentication lane 128 may traverse a particular trace, resistor, capacitor, and/or inductor between the first port 116a and second port 116b. When a signal is passed across the authentication lane 128, the characteristics of the authentication lane 128 can be measured by measuring the characteristics of the signal, either upon transmission from one port 116 or upon receipt at another port 116.

The characteristics of the signal that traverses the authentication lane 128 may be used to confirm the authentication lane 128 is authentic, valid, and that the connection between the ports 116a, 116b has not been subject to tamper. If a valid authentication lane 128 is detected as flowing through the circuitry 120 between the first port 116a and second port 116b, then it may be determined that the data lane 124 established between the first port 116a and second port 116b is authentic, valid, and not subject to tamper. Analyzing an authentication lane 128 originating from the first port 116a may also enable a determination that the first port 116a and the networking cable connected thereto is authentic, valid, and not subject to tamper, which may enable a positive determination that all data lanes 124 connected to the first port 116a are authentic, valid, and not subject to tamper. In some embodiments, the authentication lane 128 may initially be established over a pathway that will eventually be traversed by a data lane 124. The authentication lane 128 may be used to authenticate any appropriate number of components in the network switch 104 (e.g., a NIC, a port 116, the circuitry 120, etc.) or connected to the network switch 104 (e.g., a network cable, an adapter device, etc.) because the authentication lane 128 will exhibit a particular set of characteristics (e.g., transmission time, noise, jitter, amplitude, frequency, resistance, capacitance, inductance, etc.) as long as the network switch 104 and components connected to the network switch 104 are designed as expected and being used as expected. In this way, the authentication lane 128 can be used to detect a possible "man-in-the-middle" attack posed by someone placing an unexpected component in the network switch 104 or attached to the network switch 104. In some embodiments, the authentication lane 128 may include a redundant path that does not carry data between the first port 116a and second port 116b. Rather, the authentication lane 128 may be designed for solely carrying an authentication signal and may never actually be used to carry data in the network switch 104.

In some embodiments, the processor 132 may be configured to analyze the authentication lane 128 and determine whether or not a signal carried by the authentication lane 128 is valid and exhibiting the appropriate, expected characteristics. While depicted as being separate from the circuitry 120, it should be appreciated that the processor 132 may be integrated into or provided as part of the circuitry 120. The processor 132 may be configured to analyze the characteristics of the authentication lane 128 my executing lane authentication instructions 140, which are stored in memory 136. In some embodiments, the lane authentication instructions 140, when executed by the processor 132, may also enable the processor 132 to activate, deactivate, disable, or enable one or more data lanes 124 depending upon the results of analyzing the authentication lane 128. Said another way, the processor 132 may be configured to analyze an authentication lane 128 and then control whether or not a data lane 124 is allowed to carry data within the network switch 104 depending upon whether the authentication lane 128 passed an authentication process.

The lane authentication instructions 140 may be configured to be executed during a boot operation or any other appropriate operation in which a port 116 is trying to establish a data lane 124. For instance, a boot operation may occur when the network switch 104 is initializing and the processor 132 may execute the lane authentication instructions 140 for some or all of the ports 116a-N that have a network interface connected thereto (e.g., that have a networking cable or adapter device plugged therein). Prior to completing the boot operation, the processor 132 may check the authentication lane(s) 128 prior to allowing a data lane 124 to carry data (e.g., data packets) from one port 116 to another port 116. As another example, a boot operation may occur when the network switch 104 has a new network interface connected thereto and the boot operation may be performed for the port 116 that receives the network interface. As another example, a boot operation may occur when the network switch 104 loses power and is reinitializing after the loss of power. In some embodiments, the processor 132 may execute the lane authentication instructions 140 during runtime at periodic intervals, in response to detecting a particular event, and/or randomly.

The processor 132 may be provided on a circuit board (e.g., a Printed Circuit Board (PCB)) that is connected to the circuitry 120 by one or more wires or traces. In some embodiments, the circuitry 120 and processor 132 may be provided on a common carrier board or the components of the processor 132 may be mounted to the same structure that also houses the circuitry 120.

The processor 132 may be configured to execute the instructions stored in memory 136. As some non-limiting examples, the processor 132 may correspond to a microprocessor, an IC chip, a Central Processing Unit (CPU), a Graphics Processing Unit (GPU), or the like. The memory 136 may correspond to any appropriate type of memory device or collection of memory devices configured to store instructions. Non-limiting examples of suitable memory devices that may be used for memory 136 include Flash memory, Random Access Memory (RAM), Read Only Memory (ROM), variants thereof, combinations thereof, or the like. In some embodiments, the memory 136 and processor 132 may be integrated into a common device (e.g., a microprocessor may include integrated memory).

Although depicted as being provided in the network switch 104, the processor 132 and/or lane authentication instructions 140 may be provided in a separate computing device 112 (e.g., not within the network switch 104). For instance, the processor 132 and lane authentication instructions 140 may be provided in an administration device that is operated by an entity providing hosting services for the network switch 104. The administration device may be connected to the network switch 104 via a port 116.

Figure 2:
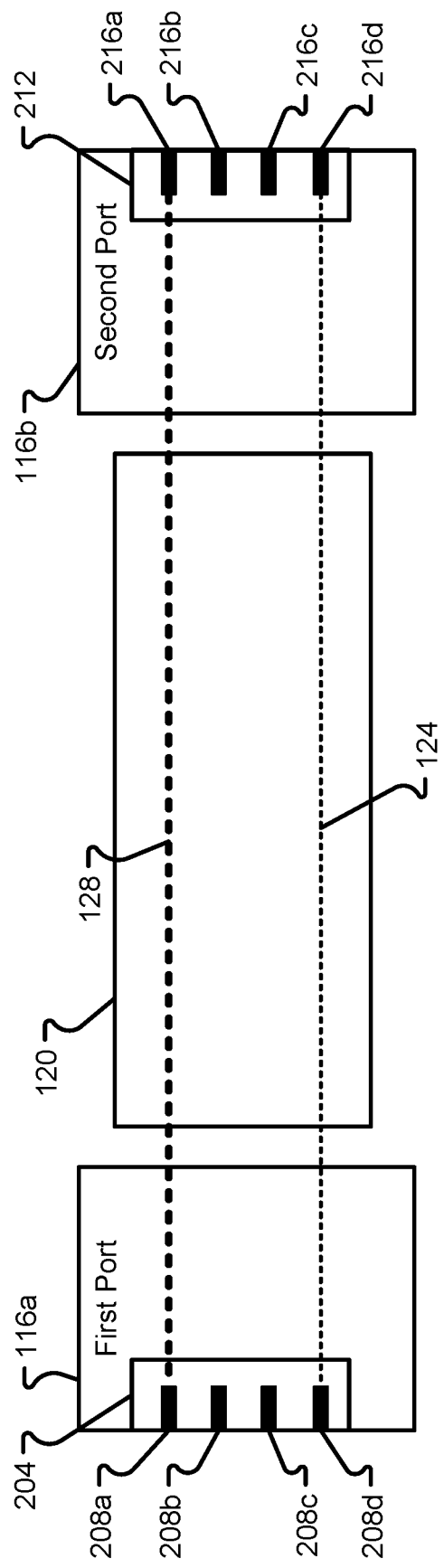
FIG. 2 is a block diagram depicting one possible implementation of an authentication lane established between a first port and second port of a network switch in accordance with at least some embodiments of the present disclosure.

With reference now to FIG. 2-6, various configurations of authentication lane(s) 128 will be described in accordance with at least some embodiments. Referring initially to FIG. 2, a first configuration is shown where an authentication lane 128 is established between a first port 116a and a second port 116b. In the illustrated configuration, the authentication lane 128 passes through the circuitry 120 and is established in parallel with the data lane 124. While only one data lane 124 is depicted, it should be appreciated that more than one data lane 124 may be established between the first port 116a and second port 116b.

The first port 116a is depicted to include a first set of terminals 204 while the second port 116b is depicted to include a second set of terminals 212. The first set of terminals 204 is shown to include a first terminal 208a, a second terminal 208b, a third terminal 208c, and a fourth terminal 208d. The second set of terminals 212 is shown to include a first terminal 216a, a second terminal 216b, a third terminal 216c, and a fourth terminal 216d. Although the first set of terminals 204 and second set of terminals 212 are shown to include the same number of terminals, it should be appreciated that the first set of terminals 204 may have a different number of terminals than the second set of terminals 212. For instance, the first set of terminals may have four terminals whereas the second set of terminals 212 may have more than four terminals or less than four terminals.

Even though both ports 116a, 116b are shown to include the same number of terminals, it should be appreciated that not all of the terminals may be used by either the first port 116a or second port 116b. For instance, the first port 116a may be connected (e.g., mating) with a first network interface that communicates using a first number of channels (e.g., four channels) whereas the second port 116b may be connected (e.g., mating) with a second network interface that communicates using a second number of channels (e.g., one channel). In this situation, because the second port 116b will only use one of its terminals (e.g., the fourth terminal 216d) to support communications on a single channel, there is no need for additional data lane 124 between the first port 116a and second port 116b. The existence of unused or redundant terminals in the first set of terminals 204 and second set of terminals 212 presents an opportunity to establish the authentication lane 128 between an otherwise unused first terminal 208a of the first port 116a and an unused first terminal 216a of the second port 116b. The authentication lane 128 may be established as long as the data lane 124 is established or the authentication lane 128 may only be established temporarily for the purposes of completing a boot operation and authenticating the circuitry 120 between ports 116a, 116b. Once the boot operation is completed and the authentication lane 128 has been determined to be authentic/valid, the authentication lane 128 may be deactivated/disabled whereas the data lane 124 may continue to persist between the first port 116a and second port 116b. Because the authentication lane 128 may not be needed to carry data between the first port 116a and second port 116b, the need for maintaining the authentication lane 128 is not required, although it may be useful to maintain the authentication lane 128 if further authentication is desired during runtime.

Figure 3:
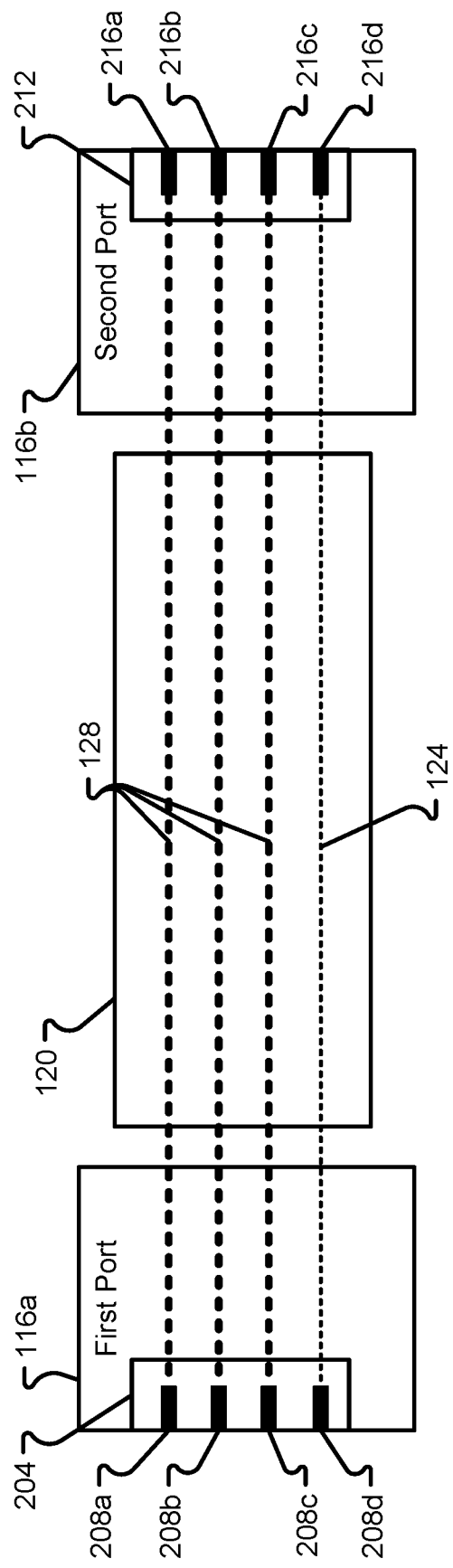
FIG. 3 is a block diagram depicting another possible implementation of multiple authentication lanes established between a first port and second port of a network switch in accordance with at least some embodiments of the present disclosure.

As can be seen in FIG. 3, a plurality of authentication lanes 128 may be established between the first port 116a and second port 116b. As an example, all of the terminals in the first set of terminals 204 or the second set of terminals 212 that are not allocated for the data lane 124 may be configured to have an authentication lane 128 established therebetween. In the depicted example, the first terminals 208a, 216a have a first authentication lane 128 passing therebetween, the second terminals 208b, 216b have a second authentication lane 128 passing therebetween, and the third terminals 208c, 216c have a third authentication lane 128 passing therebetween. If the first port 116a has a lesser number of terminals in the first set of terminals 204 than the second port 116 has in the second set of terminals 212, then a number of authentication lanes established between the first port 116a and second port 116b may be limited by the number of redundant/unused terminals in the first set of terminals 204. In the depicted example, each of the plurality of authentication lanes 128 are established in parallel with the data lane 124 and all of the authentication lanes 128 pass through the circuitry 120. It should be appreciated that each authentication lane 128 does not necessarily need to pass through the same circuitry 120 components. Rather, dedicated paths through the circuitry 120 may be traversed by each of the authentication lanes 128.

Figure 4:
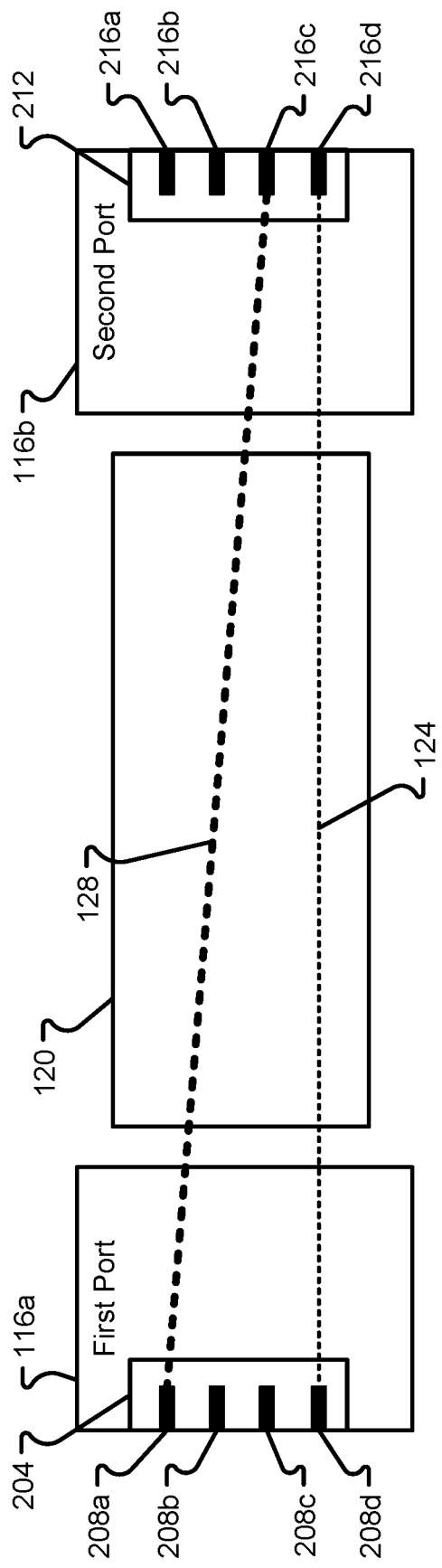
FIG. 4 is a block diagram depicting yet another possible implementation of an authentication lane established between a first port and second port of a network switch in accordance with at least some embodiments of the present disclosure.

FIG. 4 illustrates another possible configuration where an authentication lane 128 crosses from the first terminal 208a in the first port 116a to a terminal other than the first terminal 216a in the second port 116b. In this particular example, the authentication lane 128 passes between the first terminal 208a in the first port 116a and the third terminal 216c in the second port 116b.

Figure 5:
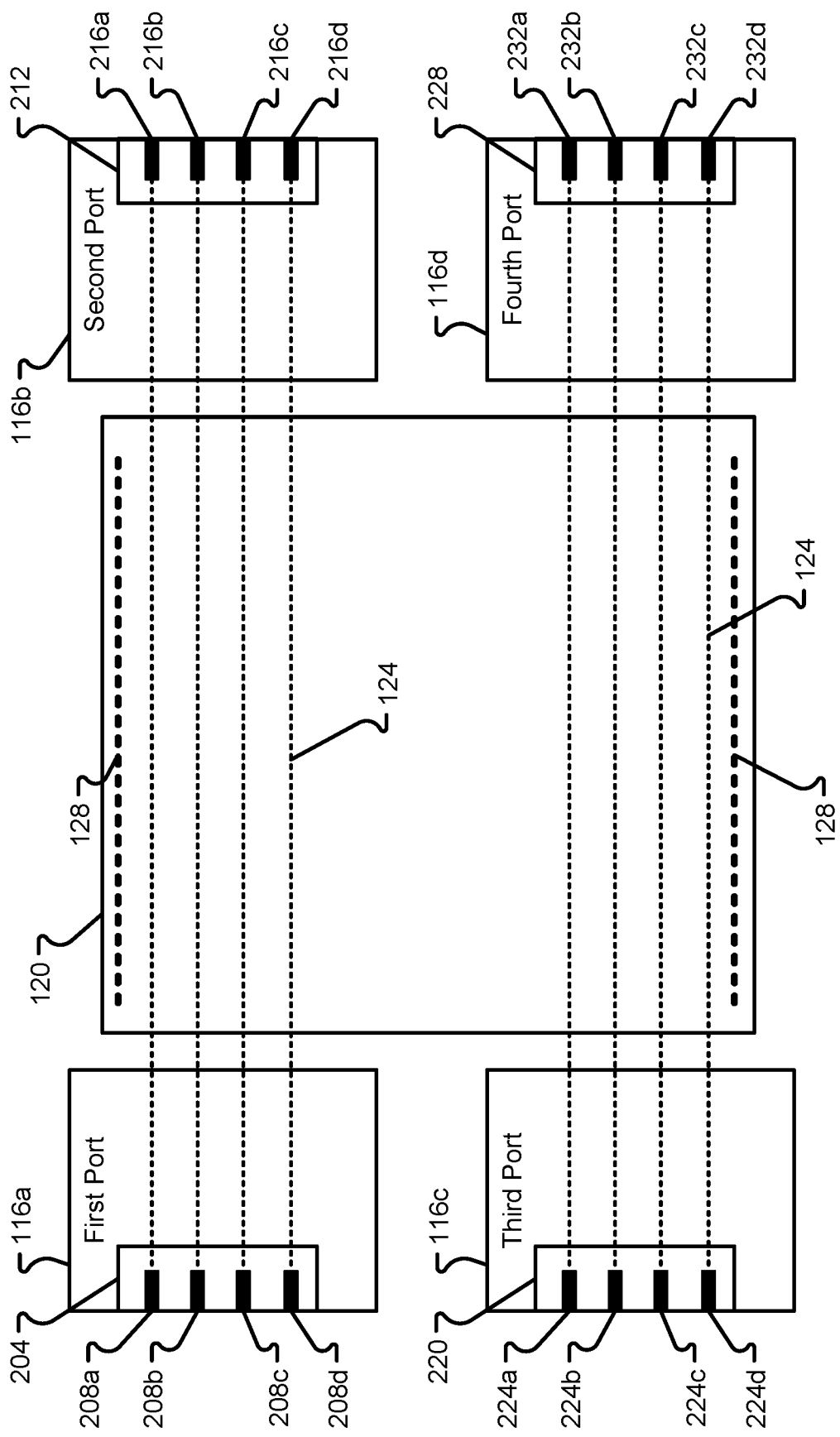
FIG. 5 is a block diagram depicting another possible implementation of multiple authentication lanes established in a network switch in accordance with at least some embodiments of the present disclosure.

FIG. 5 illustrates yet another possible configuration where multiple data lanes 124 are established between ports 116 and an additional authentication lane 128 is established within circuitry 120. The illustrated authentication lanes 128, however, do not connect to any port between which data lanes 124 are established. Rather, the configuration of FIG. 5 affords the ability to connect all of the terminals of one port to all of the terminals of another port without occupying at least one of the terminals with an authentication lane 128.

In the illustrative example, four data lanes 124 are shown to pass between the first port 116a and second port 116b. FIG. 5 also illustrates a third port 116c and fourth port 116d having four data lanes 124 passing therebetween. The third port 116c is shown to include a third set of terminals 220 having a first terminal 224a, a second terminal 224b, a third terminal 224c, and a fourth terminal 224d. The fourth port 116d is shown to include a fourth set of terminals 228 having a first terminal 232a, a second terminal 232b, a third terminal 232c, and a fourth terminal 232d. In some embodiments, a maximum number of data lanes 124 can be established between the first port 116a and second port 116b and a maximum number of data lanes 124 can also be established between the third port 116c and fourth port 116d. In some embodiments, up to M data lanes 124 may be established between the first port 116a, second port 116b, third port 116c, and fourth port 116d, where M is an integer number greater than one. One or more authentication lanes 128 can be provided in circuitry 120 and can be used to authenticate the connection between the ports without occupying a terminal of a port. In other words, the authentication lane(s) 128 may be configured to traverse a path through the circuitry 120 that is not included in any of the M lanes.

In some embodiments, a different authentication lane 128 may be used to authenticate each port pair. As one example, one authentication lane 128 may be used to control whether or not data lanes 124 between the first port 116a and second port 116b are established whereas another authentication lane 128 may be used to control whether or not other data lanes 124 between the third port 116c and fourth port 116d are established. In other embodiments, both authentication lanes 128 may be used to authenticate the circuitry 120 and the ability to transmit data across any of the data lanes 124 may depend upon each/all of the authentication lanes 128 passing an authentication process.

Although not depicted, one or both authentication lanes 128 may be activated by a control signal issued by the processor 132. Alternatively or additionally, the circuitry 120 may include an IC chip, microprocessor, or the like that issues a control signal to selectively activate and deactivate one or both of the authentication lanes 128. In some embodiments, the authentication lane(s) 128 may be selectively activated to change one or more characteristics of the data lanes 124. For example, when one or both of the authentication lanes 128 are activated, the signal to noise ratio or bit error rate of the signal transmitted across the data lane 124 may change. This change can be measured in the data lane 124 to detect the authentication lane 128. Even more specifically, if an authentication lane 128 is activated in response to a control signal issued by the processor 132 in response to executing the lane authentication instructions 140, the activation of the authentication lane 128 may change a bit error rate of one or more data lanes 124. The changes in the bit error rate may be measured by the processor 132 to detect an existence of the authentication lane(s) 128 even though the authentication lane(s) 128 do not necessarily connect one terminal to another terminal. Other characteristics of the data lane 124 that may change in response to a selective activation of an authentication lane 128 include, without limitation, jitter, noise, packet loss, packet delay, etc. When the authentication lane 128 is deactivated, the characteristics of the data lane(s) 124 may return to normal or some other expected behavior.

Figure 6:
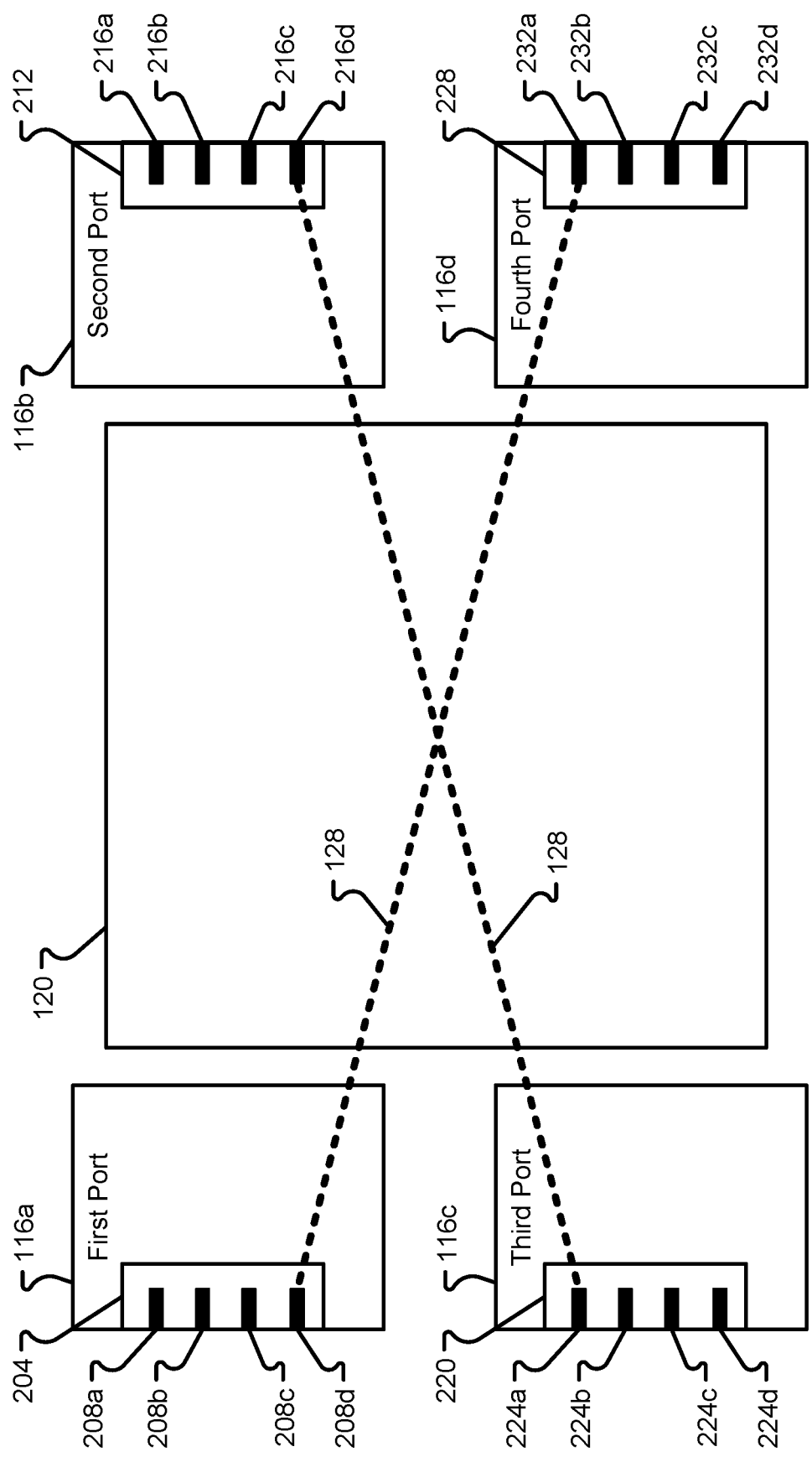
FIG. 6 is a block diagram depicting still another possible implementation of multiple authentication lanes established in a network switch in accordance with at least some embodiments of the present disclosure.

FIG. 6 illustrates a four-port configuration where one authentication lane 128 crosses another authentication lane 128 established between different ports. Specifically, but without limitation, one authentication lane 128 may be established between the first port 116a and the fourth port 116d while another authentication lane 128 may be established between the third port 116c and the second port 116b. In the illustrated example, one authentication lane 128 travels from the fourth terminal 208d of the first port 116a to the first terminal 232a of the fourth port 116d while another authentication lane 128 travels from the first terminal 224a of the third port 116c to the fourth terminal 216d of the second port 116b. The authentication lanes 128 may be used to ensure that cross-port connections are authentic prior to enabling any appropriate combination of data lanes to be established and carry data between the first port 116a, the second port 116b, the third port 116c, and/or the fourth port 116d. For example, the illustrated authentication lanes 128 may be used to control whether or not data lanes 124 such as those showed in FIG. 5 are established.

Figure 7:
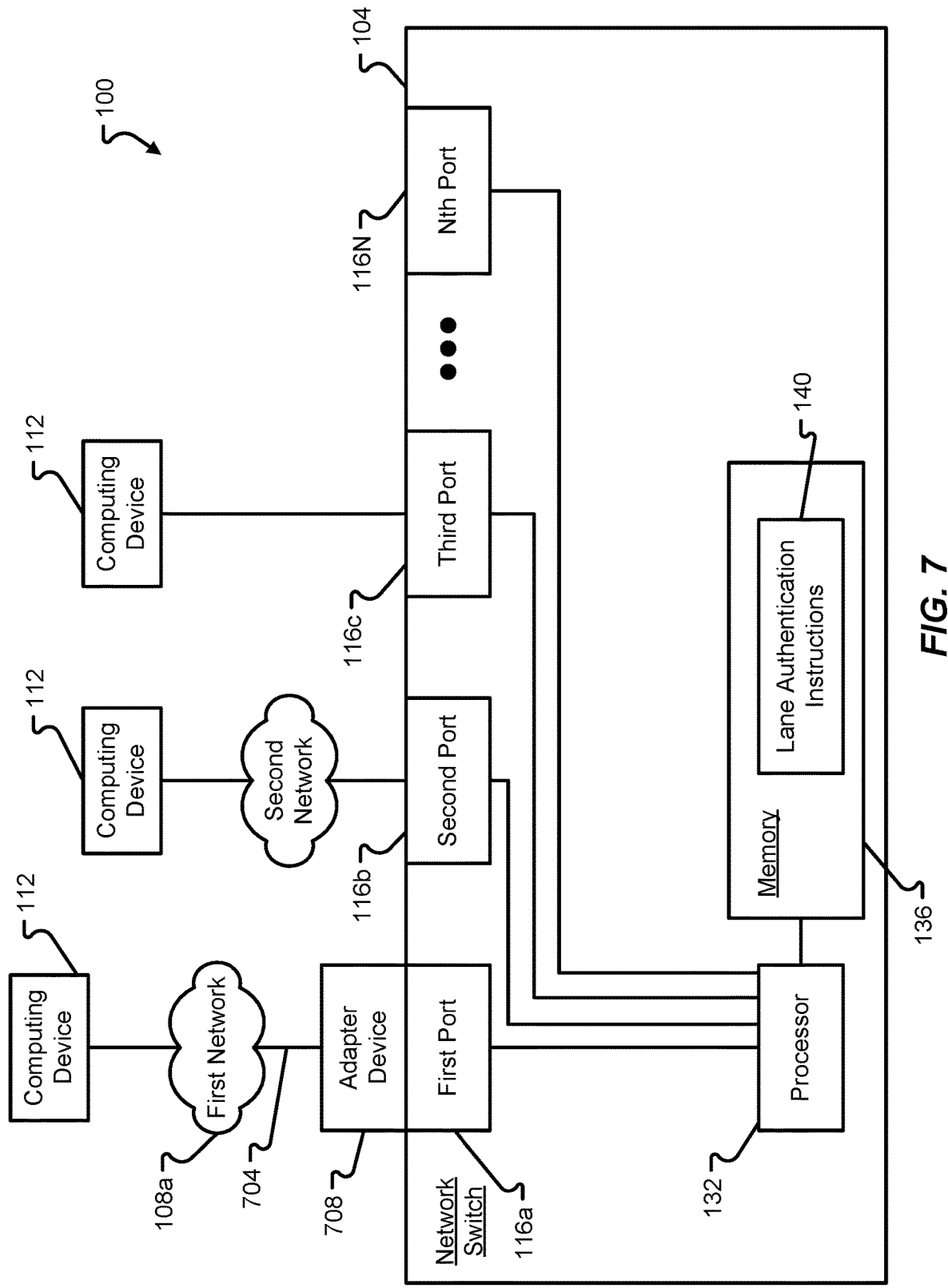
FIG. 7 is a block diagram depicting a second illustrative configuration of a communication system in accordance with at least some embodiments of the present disclosure.

With reference now to FIGS. 7-11, another possible configuration of a communication system 100 will be described in accordance with at least some embodiments of the present disclosure. The communication system 100 configuration of FIG. 7 is similar to that of the communication system 100 configuration shown in FIG. 1. FIG. 7 further illustrates an adapter device 708 that connect the first port 116a to a networking cable 704 of the first network 104a.

The networking cable 704 may correspond to a cable (e.g., electrical cable, optical cable, fiberoptic cable, etc.) having a network interface configured to support communications over the first network 108a. As an example, if the first network 108a is configured as an Ethernet network, then the networking cable 704 may correspond to any appropriate type of Ethernet cable, CAT5 cable, CAT5e cable, CAT6 cable, CAT6a cable, CAT7 cable, or CAT8 cable. The networking cable 704 may have a connector configured to present a networking interface to the adapter device 708 from the networking cable 704. Examples of networking interfaces that may be provided on the networking cable 704 include, without limitation, a USB interface, an RJ45 connector, a GC45 connector, etc. As mentioned above, the networking cable 704 may alternatively or additionally be configured with fiberoptics and, therefore, may be configured with an optical networking interface to connect with the adapter device 708.

Although only the first network 108a is shown as being connected to the first port 116a through an adapter device 708, it should be appreciated that multiple different adapter devices 708 may be connected to different ports 116a-N of the network switch 104, thereby enabling the network switch 104 to interconnect multiple different types of networks and computing devices 112 on those different types of networks.

FIG. 7 also illustrates a configuration where each port 116a-N is connected directly to the processor 132, thereby enabling the processor 132 to directly analyze an authenticity of each port 116a-N and to analyze an authenticity of an adapter device 708 connected to any of the ports 116a-N. The circuitry 120 is not shown in FIG. 7 for ease of presentation and understanding, but it should be appreciated that circuitry 120 can be provided between the ports 116a-N to deliver a switching fabric or topology between the ports 116a-N.

Figure 8:
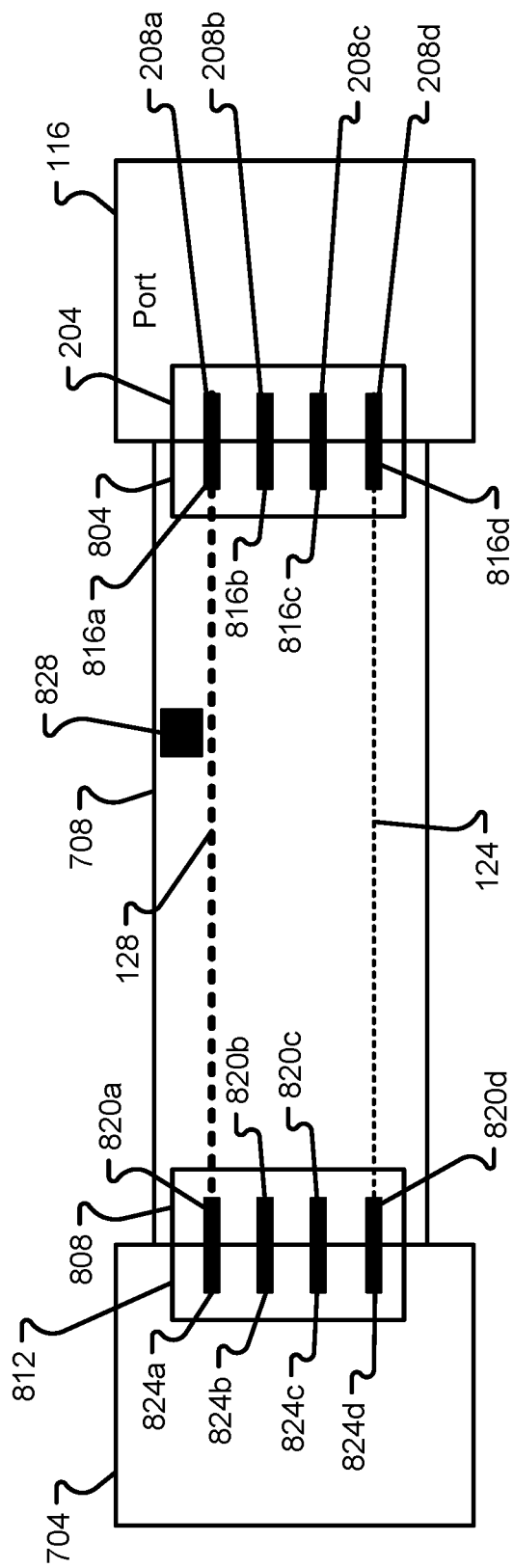
FIG. 8 is a block diagram depicting a possible implementation of an authentication lane established in an adapter device in accordance with at least some embodiments of the present disclosure.

FIG. 8 illustrates additional details of an adapter device 708 used to connect a networking cable 704 to a port 116 in accordance with at least some embodiments of the present disclosure. The adapter device 708 may correspond to any appropriate type of known or yet-to-be-developed network cable adapter or collection of adapter devices. A non-limiting example of an adapter device 708 is a network cable adapter, such as the adapter for a pluggable module depicted and described in U.S. Pat. No. 7,934,959, the entire contents of which are hereby incorporated herein by reference. Other examples of adapter devices may include USB-to-Ethernet adapters, USB-to-Gigabit Ethernet adapters, Ethernet adapters, PCIe adapters, Fibre Channel adapters, or the like. The adapter device 708 may include additional cabling (e.g., as a dongle device), a board and chip, mechanical interface devices, electrical interface devices, optical interface devices, or combinations thereof.

In the example shown in FIG. 8, the adapter device 708 includes a first set of adapter terminals 804 and a second set of adapter terminals 808. The first set of adapter terminals 804 are configured to provide an interface with the set of terminals 204 presented by the port 116. As discussed above, the set of terminals 204 provided in the port 116 may include a first terminal 208a, a second terminal 208b, a third terminal 208c, and a fourth terminal 208d. Of course, the set of terminals 204 may include a greater or lesser number of terminals than are depicted in FIG. 8.

The first set of adapter terminals 804 may include a same number of terminals as the set of terminals 204 provided in the port 116, although such a configuration is not necessarily required. Illustratively, the first set of adapter terminals includes a first terminal 816a, a second terminal 816b, a third terminal 816c, and a fourth terminal 816d. Each terminal in the first set of adapter terminals 804 may provide an electrical and/or optical coupling with a respective terminal in the set of terminals 204 provided in the port 116.

The second set of adapter terminals 808 is shown to include a first terminal 820a, a second terminal 820b, a third terminal 820c, and a fourth terminal 820d. The second set of adapter terminals 808 may be configured to mate with a network interface 812 of the networking cable 704. In some embodiments, the network interface 812 may include a same number of terminals as are provided in the second set of adapter terminals 808. For instance, the network interface 812 may include a first terminal 824a, a second terminal 824b, a third terminal 824c, and a fourth terminal 824d. Each terminal in the second set of adapter terminals 808 may provide an electrical and/or optical coupling with a respective terminal in the network interface 812.

It should be appreciated that the number of terminals in the first set of adapter terminals 804 does not necessarily have to equal the number of terminals in the second set of adapter terminals 808. In some embodiments, either the networking cable 704 or port 116 may be configured to communicate using a different number of channels, which means that one of the terminals in the adapter device 708 may be redundant or not used for a data lane 124. In such a configuration, one of the unused terminals in the first set of adapter terminals 804 and one of the unused terminals in the second set of adapter terminals 808 may be used to establish an authentication lane 128. In the depicted example, the data lane 124 is established between the fourth terminal 816d of the first set of adapter terminals 804 and the fourth terminal 820d of the second set of adapter terminals 808.

The data lane 124 may be used to carry data (e.g., data packets) between the networking cable 704 and port 116. The authentication lane 128, on the other hand, may be analyzed by the processor 132 to determine an authenticity of the adapter device 708. In the event that the processor 132 is not able to successfully authenticate the authentication lane 128, the adapter device 708 may not be authenticated and the data lane 124 may be prohibited from carrying data between the port 116 and networking cable 704. In some embodiments, the processor 132 may report that a possibly fraudulent adapter device 708 has been inserted in the port 116 or that the data lane 124 has not been successfully established. The report may be provided to an administration device (e.g., a computing device 112) immediately upon determining that the adapter device 708 has not passed an authentication process or after a predetermined number of failed authentication attempts. The report may also identify the port 116 in which the adapter device 708 is connected and the network to which the adapter device 708 is connected.

The adapter device 708 may further include an integrated processor 828. The processor 828 may correspond to an IC chip, a microprocessor, an ASIC, a Field Programmable Gate Array (FPGA), etc. Although depicted as a processor 828, the component represented by processor 828 may have little or no processing capabilities, but rather may be provided as simple controllable memory, programmable memory, integrated memory of a processor, or the like. The processor 828 may be provided within a housing of the adapter device 708 along with a circuit board that connects the processor 828 with one or more terminals from the first set of adapter terminals 804 and/or second set of adapter terminals 808. In some embodiments, the processor 828 may be part of the circuitry through which the data lane 124 or authentication lane 128 traverses. In some embodiments, the processor 828 may correspond to a component of the adapter device 708 that controls an activation/deactivation of the authentication lane 128. The processor 828 may be configured to operate independently or in response to control signals received from a processor 132 of the network switch 104.

Figure 9:
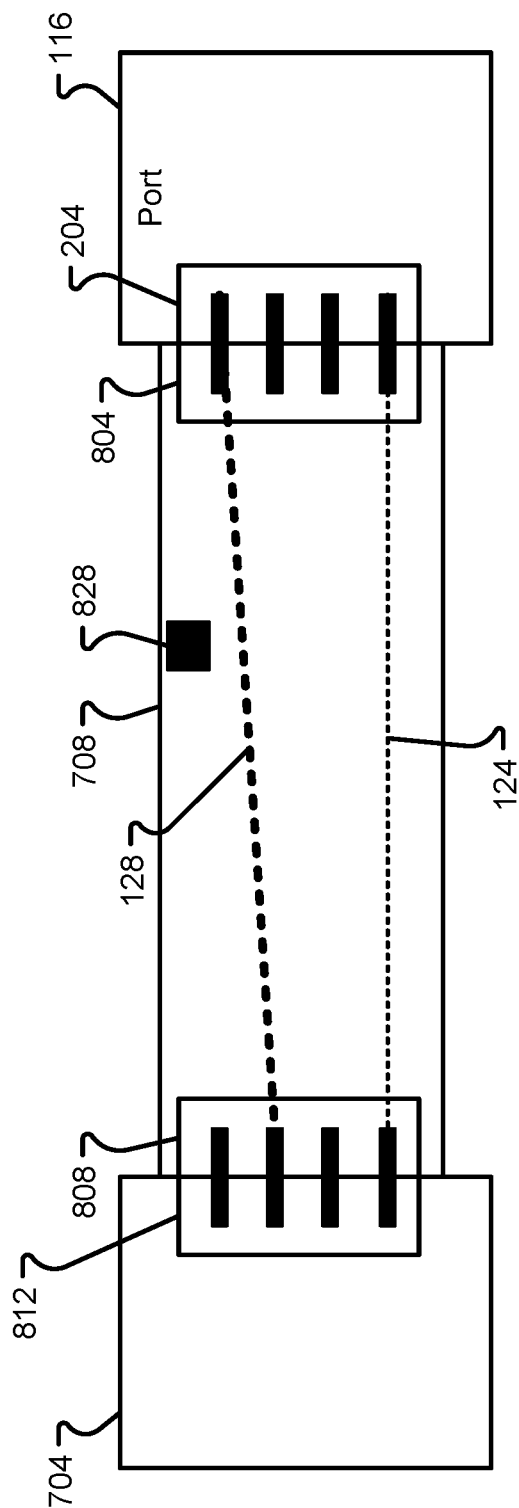
FIG. 9 is a block diagram depicting another possible implementation of an authentication lane established in an adapter device in accordance with at least some embodiments of the present disclosure.

As shown in FIG. 9, the authentication lane 128 does not necessarily need to be established between corresponding terminals in the first set of adapter terminals 804 and second set of adapter terminals 808. For instance, the authentication lane 128 may be established between a first terminal 816a in the first set of adapter terminals 804 and a second terminal 820b in the second set of adapter terminals 808. This type of authentication lane 128 may provide another alternative path for the authentication lane 128, which may or may not exhibit the same characteristics as an authentication lane 128 established between the first terminals 816a, 820a of the first set of adapter terminals 804 and second set of adapter terminals 808.

Figure 10:
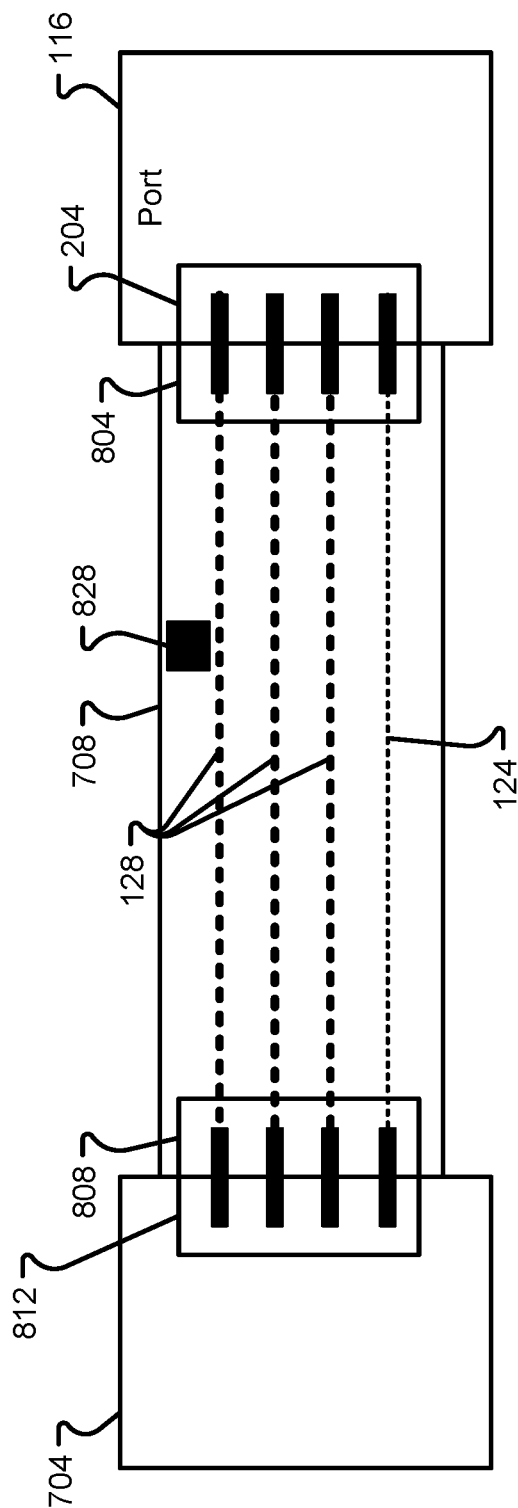
FIG. 10 is a block diagram depicting yet another possible implementation of multiple authentication lanes established in an adapter device in accordance with at least some embodiments of the present disclosure.

FIG. 10 illustrates that the number of authentication lanes 128 does not necessarily need to be limited to a single authentication lane 128 for purposes of authenticating the adapter device 708. Rather, multiple authentication lanes 128 may be established through the adapter device 708, using any number of terminals in the first set of adapter terminals 804 and second set of adapter terminals 808. In some embodiments, the number of authentication lanes 128 may be adjustable or subject to modification so that the number of authentication lanes 128 used to authenticate an adapter device 708 becomes less predictable. Making the number and/or configuration of authentication lanes 128 subject to adjustment helps to ensure that an attacker cannot easily spoof an adapter device with an authentication lane 128, where the number and configuration of the authentication lane 128 is predictable or known.

Figure 11:
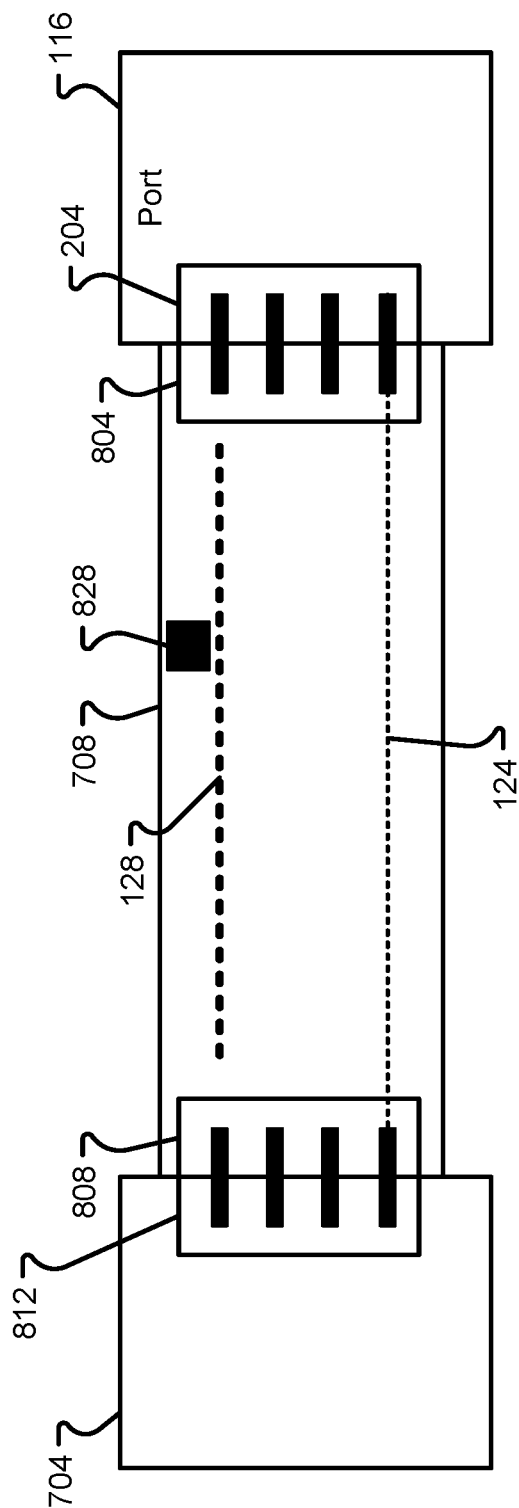
FIG. 11 is a block diagram depicting another possible implementation of an authentication lane established in an adapter device in accordance with at least some embodiments of the present disclosure.

FIG. 11 illustrates still another possible configuration of an adapter device 708 in which an authentication lane 128 does not connect between a terminal in the first set of adapter terminals 804 and a terminal in the second set of terminals 808. While not depicted, the authentication lane 128 may connect to one of the terminals (e.g., a terminal in the first set of terminals 804) so that the authentication lane 128 can be selectively activated and/or deactivated in response to a control signal issued by the processor 132 in the network switch 104. In some embodiments, the authentication lane 128 may be selectively activated and deactivated by control signals issued by the processor 828 and/or processor 132. Furthermore, although only one authentication lane 128 is depicted, it should be appreciated that the adapter device 708 may include a number of authentication lanes 128 (e.g., as shown in FIG. 10), where one, some, or all of the authentication lanes 128 are controlled by the processor 828.

In some embodiments, the authentication lane 128 may be selectively activated to change one or more characteristics of the data lanes 124. For example, when an authentication lane 128 is activated, the signal to noise ratio or bit error rate of the signal transmitted across the data lane 124 may change. This change can be measured by the processor 828 or processor 132 executing the lane authentication instructions 140. Even more specifically, if an authentication lane 128 is activated in response to a control signal issued by the processor 828 or processor 132 in response to executing the lane authentication instructions 140, the activation of the authentication lane 128 may change a bit error rate of a data lane 124. The changes in the bit error rate may be measured to detect an existence of the authentication lane 128 even though the authentication lane 128 does not necessarily connect one terminal to another terminal. Other characteristics of the data lane 124 that may change in response to a selective activation of an authentication lane 128 include, without limitation, jitter, noise, packet loss, packet delay, etc. When the authentication lane 128 is deactivated, the characteristics of the data lane(s) 124 may return to normal or some other expected behavior.

Figure 12:
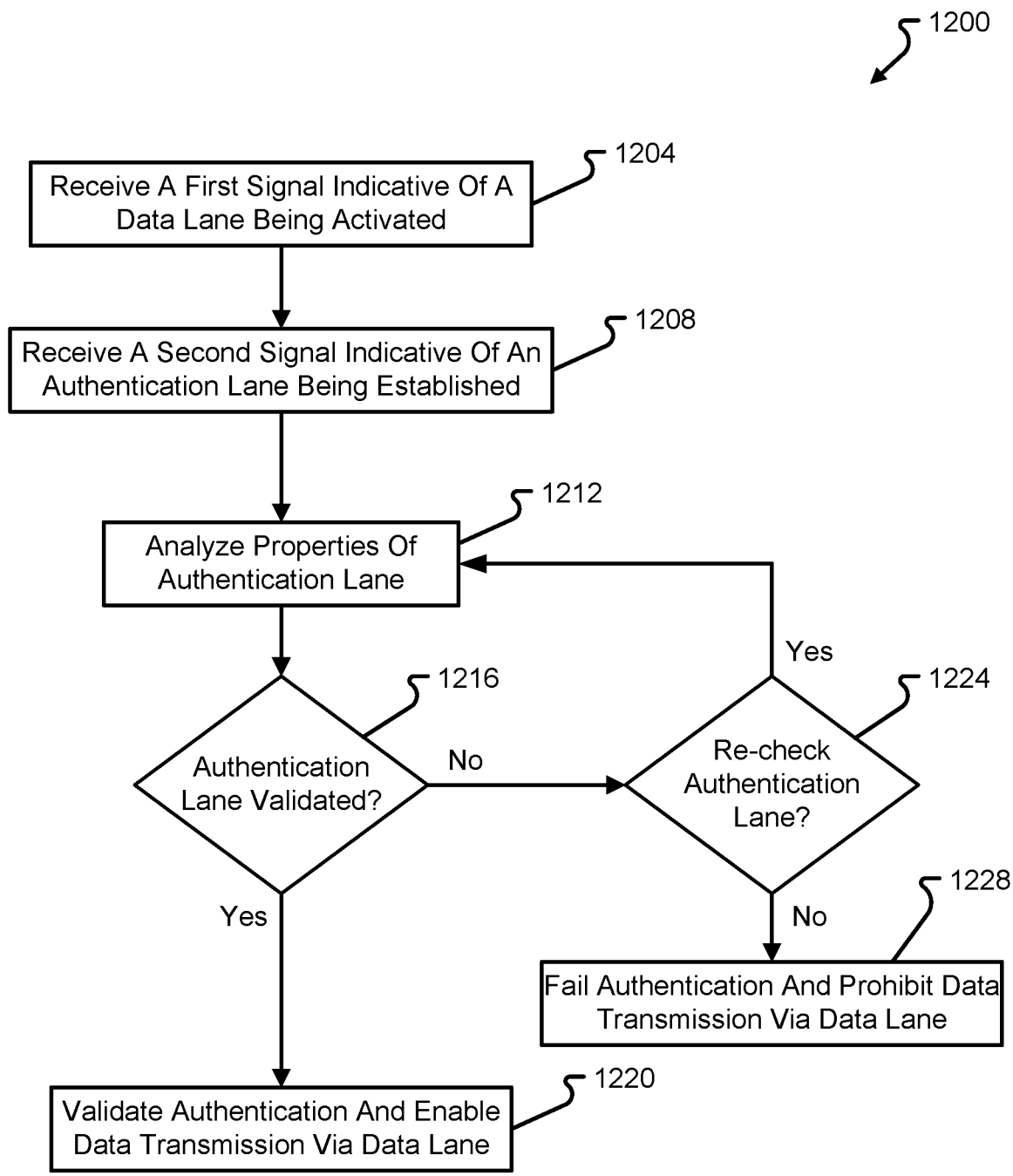
FIG. 12 is a flow diagram depicting an authentication method in accordance with at least some embodiments of the present disclosure.

Referring now to FIG. 12, an illustrative authentication method 1200 will be described in accordance with at least some embodiments of the present disclosure. The method 1200 may be performed in a network switch 104 by a processor 132. The processor 132 performing the method 1200 may or may not be provided in the network switch 104. For example, the processor 132 performing the method 1200 may be provided external to the network switch 104 in a computing device 112 and/or may be performed by a processor 828 in an adapter device 708. It should also be appreciated that the order of operations depicted in FIG. 12 should not be construed as limiting embodiments of the present disclosure. For instance, certain steps may be performed in a different order without departing from the scope of the present disclosure. Furthermore, some steps may be performed in parallel (e.g., simultaneously) with one another.

The method 1200 begins when the processor 132, 828 receives a first signal indicative of a data lane 124 being activated (or awaiting activation) (step 1204). The first signal may also indicate that the data lane 124 is configured (or will be configured) to carry data from a first port 116a to a second port 116b. Alternatively or additionally, this step may include receiving a first signal indicative of a data lane 124 being activated (or awaiting activation) within an adapter device 708. In either situation, the first signal may indicate that a data lane 124 is configured (or will be configured) to carry data from a first set of terminals to a second set of terminals.

The method 1200 continues with the processor 132, 828 receiving a second signal indicative of an authentication lane 128 being established (step 1208). The authentication lane 128 may be established within the network switch 104 and/or within an adapter device 708 connected to the network switch 104. The authentication lane 128 may or may not be established between a first set of terminals and a second set of terminals and may or may not traverse circuitry 120 within the network switch 104. Furthermore, the authentication lane 128 may or may not be established in parallel with the data lane 124. In some embodiments, the processor 132, 828 may receive multiple signals indicative of different authentication lanes 128 being established.

The method 1200 then continues with the processor 132, 828 analyzing the properties or characteristics of the authentication lane 128 (step 1212). In some embodiments, the characteristics of the authentication lane 128 may be analyzed prior to enabling establishment of the data lane(s) 124. Analysis of the authentication lane 128 may be done by analyzing properties of the second signal received in step 1208. Characteristics of the authentication lane 128 that may be established in step 1212 may include one or more of transmission time, noise, jitter, amplitude, frequency, resistance, capacitance, and inductance.

The processor 132, 828, based on the analysis of the authentication lane 128, will determine whether the authentication lane 128 has passed the authentication process (step 1216). If the measured characteristics of the authentication lane 128 are equal to or sufficiently near (e.g., within a defined tolerance based on noise, expected deviations, etc.) expected characteristics, then the authentication analysis may result in the authentication lane 128 being identified as authentic, valid, and not subject to tamper. If the measured characteristics of the authentication lane 128 are not equal to or sufficiently near expected characteristics, then the authentication lane 128 may not pass the authentication process. Alternatively or additionally, the authentication lane 128 may not pass the authentication process the authentication lane 128 exhibits an ability to carry data between ports 116 or terminals of an adapter device 708. Said another way, an authentication signal may not be received when one or more the authentication lanes 128 exhibits an ability to carry data. In another possible configuration, characteristics (e.g., bit error rate) of a data lane 124 may be measured to detect whether an authentication lane 128 has been activated.

If the query of step 1216 is answered positively, then the authentication lane 128 may be validated as authentic and the data lane 124 may be enabled for data transmission (step 1220). Specifically, as long as the authentication lane 128 passes the authentication analysis, then any data lane 124 associated therewith may be allowed to carry data to or within the network switch 104.

If the query of step 1216 is answered negatively, then the method 1200 may continue by determining if the authentication lane 128 should be re-checked (e.g., whether an additional check should be performed) (step 1224). If an additional authentication check is desired, then the method 1200 returns to step 1212. Conversely, if no further authentication checks are desired, then the method 1200 may continue by failing the authentication lane 128 and prohibiting data transmission via the data lane 124 (step 1228). In some embodiments, the method 1200 may optionally include reporting the results, whether positive or negative, of the authentication process to an administration device.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A device, comprising:
  a first set of terminals configured to mate with a first network interface;
  a second set of terminals configured to mate with a second network interface;
  a data lane that is used to carry data from the first set of terminals to the second set of terminals through the first network interface and the second network interface; and
  an authentication lane established between the first set of terminals and the second set of terminals through the first network interface and the second network interface, wherein the authentication lane is analyzed to prove to another device an authenticity of the device and to control transmission of data through the device via the data lane, wherein the data lane carries data through a first terminal of the first set of terminals in the first network interface and a second terminal of the second set of terminals in the second network interface and wherein the authentication lane is connected through a third terminal of the first set of terminals in the first network interface and a second fourth terminal of the second set of terminals in the second network interface.

2. The device of claim 1, wherein the authentication lane comprises at least one redundant path that does not carry data between the first set of terminals and the second set of terminals.

3. The device of claim 1, wherein the first set of terminals mate with a first port of a network switch, wherein the another device comprises the network switch, and wherein the second set of terminals mate with a networking cable.

4. The device of claim 3, wherein the first set of terminals are pluggably removable from the first port of the network switch.

5. The device of claim 3, wherein the network switch analyzes the authentication lane and determines the authenticity of the device based on the analysis of the authentication lane.

6. A device, comprising:
  a first set of terminals configured to mate with a first network interface;
  a second set of terminals configured to mate with a second network interface;
  a data lane that is used to carry data from a first terminal of the first set of terminals to a second terminal of the second set of terminals through the first network interface and the second network interface; and
  an authentication lane established between a third terminal of the first set of terminals and a fourth terminal of the second set of terminals through the first network interface and the second network interface, wherein the authentication lane is analyzed to prove to another device an authenticity of the device and to control transmission of data through the device via the data lane, wherein the authentication lane comprises a plurality of redundant paths established between the first set of terminals and the second set of terminals, wherein each of the plurality of redundant paths do not carry data between the first set of terminals and the second set of terminals, and wherein the device is determined to be not authentic when one of the plurality of redundant paths exhibits an ability to carry data between the first set of terminals and the second set of terminals.

7. The device of claim 1, wherein a characteristic of the data lane is analyzed in connection with analyzing the authentication lane.

8. The device of claim 7, wherein the characteristic of the data lane comprises at least one of a bit error rate, signal to noise ratio, jitter, packet loss, and packet delay.

9. An authentication method for use in a network switch, the method comprising:
- receiving a first signal indicative of a data lane being activated and configured to carry data to or within the network switch;
- receiving a second signal indicative of an authentication lane being established inside the network switch or a device connected to the network switch, wherein the authentication lane is different from the data lane and established alongside the data lane, wherein the data lane is configured to carry data from a first port of the network switch to a second port of the network switch, wherein the first port comprises a first set of terminals configured to mate with a first network interface, wherein the second port comprises a second set of terminals configured to mate with a second network interface, and wherein the data lane is used to carry data from a first terminal of the first set of terminals to a second terminal of the second set of terminals through the first network interface and the second network interface; and
- enabling data transmission across the data lane only in response to receiving the second signal indicative of the authentication lane being established and not carrying data, wherein the authentication lane is established in parallel with the data lane such that the data lane and the authentication lane connect with different terminals from the first set of terminals and from the second set of terminals through the first network interface and the second network interface.

10. The authentication method of claim 9, wherein:
the first network interface communicates using a first number of channels;
the second network interface communicates using a second number of channels that is different from the first number of channels.

11. The authentication method of claim 9, wherein the first network interface communicates using a same number of channels as the second network interface.

12. The authentication method of claim 9, wherein the authentication lane comprises a redundant path that does not carry data between the first set of terminals and the second set of terminals.

13. The authentication method of claim 9, wherein the authentication lane comprises a plurality of redundant paths established between the first set of terminals and the second set of terminals, wherein each of the plurality of redundant paths do not carry data between the first set of terminals and the second set of terminals, and wherein the second signal is not received when one of the plurality of redundant paths exhibits an ability to carry data between the first set of terminals and the second set of terminals.

14. The authentication method of claim 9, wherein the authentication lane and the data lane are established in an adapter device that connects a networking cable with a port of the network switch.

15. The authentication method of claim 9, wherein the authentication lane is established between a first port of the network switch and a second port of the network switch.

16. The authentication method of claim 9, wherein the authentication lane traverses a path that does not connect a first port of the network switch and a second port of the network switch.

17. A network switch, comprising:
a first port;
a second port;
circuitry provided between the first port and the second port;
a data lane established in the circuitry and configured to carry data from the first port to the second port; and
an authentication lane established alongside the data lane in the circuitry that is analyzed to confirm that it is not carrying data as part of determining an authenticity of the circuitry wherein the authentication lane is established in the circuitry in parallel to the data lane.

18. The network switch of claim 17, wherein:
the first port comprises a first set of terminals configured to mate with a first network interface;
the second port comprises a second set of terminals configured to mate with a second network interface; and
the data lane is used to carry data from the first set of terminals to the second set of terminals.

19. The network switch of claim 18, wherein:
the first network interface communicates using a first number of channels;
the second network interface communicates using a second number of channels that is different from the first number of channels.

20. The network switch of claim 18, wherein the first network interface communicates using a same number of channels as the second network interface.

21. The network switch of claim 18, wherein the authentication lane comprises a redundant path that does not carry data between the first set of terminals and the second set of terminals.

22. The network switch of claim 18, wherein the authentication lane comprises a plurality of redundant paths established between the first set of terminals and the second set of terminals, wherein each of the plurality of redundant paths do not carry data between the first set of terminals and the second set of terminals, and wherein the circuitry is not authenticated when one of the plurality of redundant paths exhibits an ability to carry data between the first set of terminals and the second set of terminals.

23. The network switch of claim 17, further comprising:
a third port; and
a fourth port, wherein there are M lanes provided between the first port, the second port, the third port, and the fourth port, wherein M comprises an integer number greater than one, and wherein the authentication lane traverses a path not included in any of the M lanes.

24. The network switch of claim 17, wherein a characteristic of the data lane is analyzed in connection with analyzing the authentication lane.

25. The network switch of claim 24, wherein the characteristic of the data lane comprises at least one of a bit error rate, signal to noise ratio and amplitude, jitter, packet loss, and packet delay.

* * * * *